Oct. 25, 1960     B. X. GOLDMAN ET AL     2,957,604
ICE CUBE DISPENSER
Filed Feb. 17, 1958                                  9 Sheets-Sheet 1

INVENTORS
BOREL X. GOLDMAN
SOL A. MORRIS
BY
*Learman, Learman & McCulloch*
ATTORNEYS INVENTORS
BOREL X. GOLDMAN
SOL A. MORRIS
BY
*Learman, Learman & McCulloh*
ATTORNEYS Oct. 25, 1960 B. X. GOLDMAN ET AL 2,957,604
ICE CUBE DISPENSER
Filed Feb. 17, 1958 9 Sheets-Sheet 3

INVENTORS
BOREL X. GOLDMAN
SOL A. MORRIS
BY
*Learman, Learman & McCulloch*
ATTORNEYS

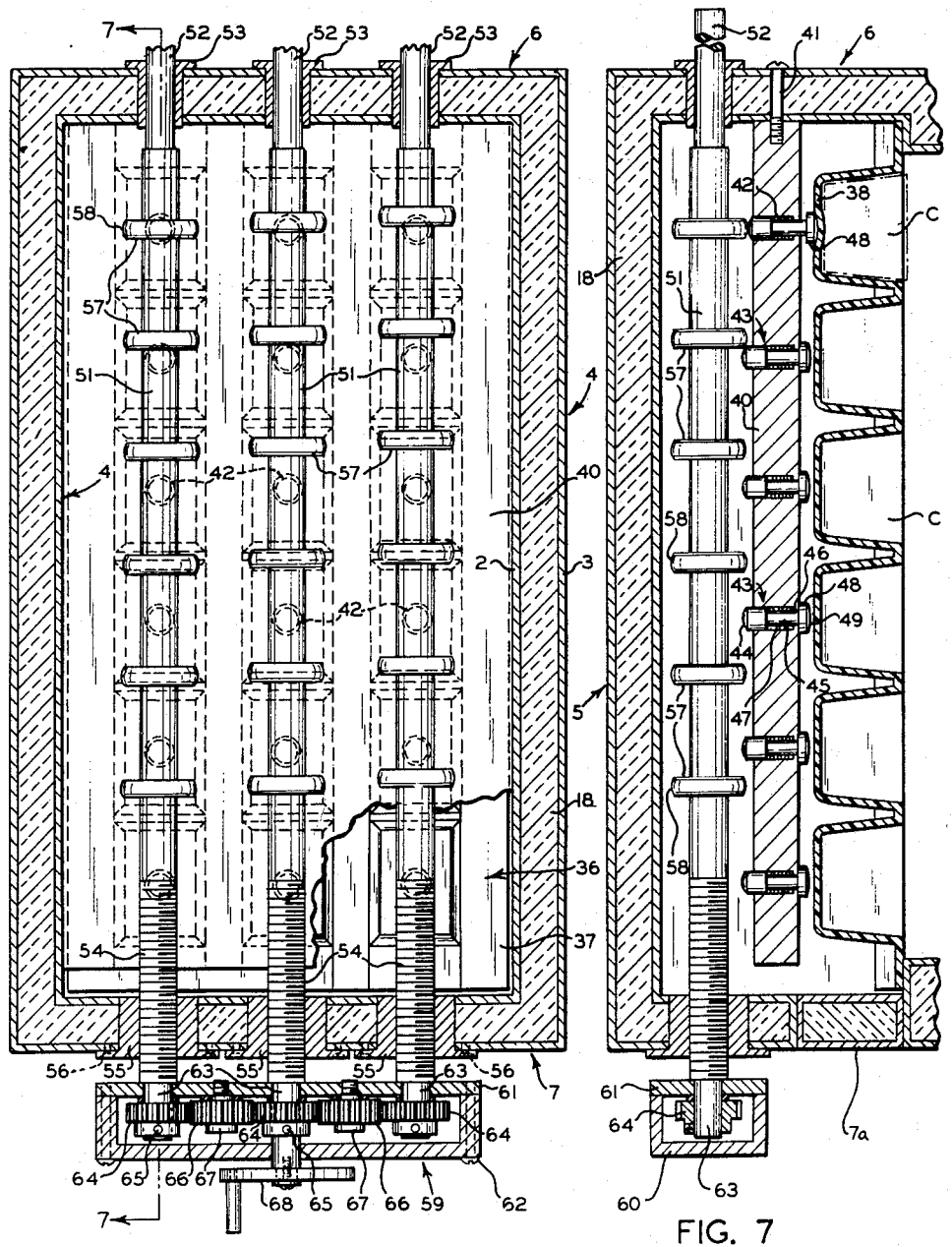

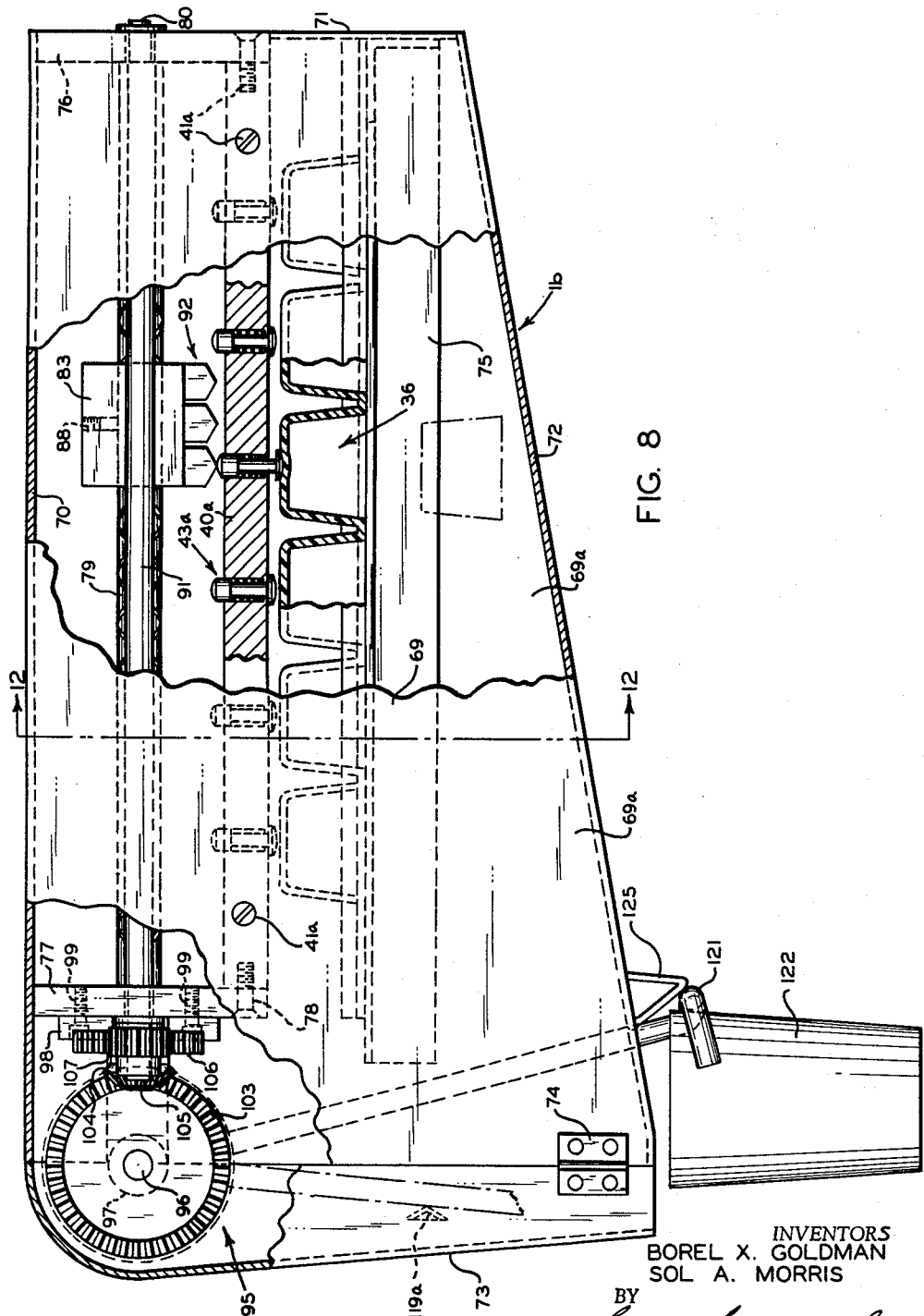

Oct. 25, 1960   B. X. GOLDMAN ET AL   2,957,604
ICE CUBE DISPENSER
Filed Feb. 17, 1958   9 Sheets-Sheet 7

INVENTORS
BOREL X. GOLDMAN
SOL A. MORRIS
BY
*Learman, Learman & McCulloch*
ATTORNEYS

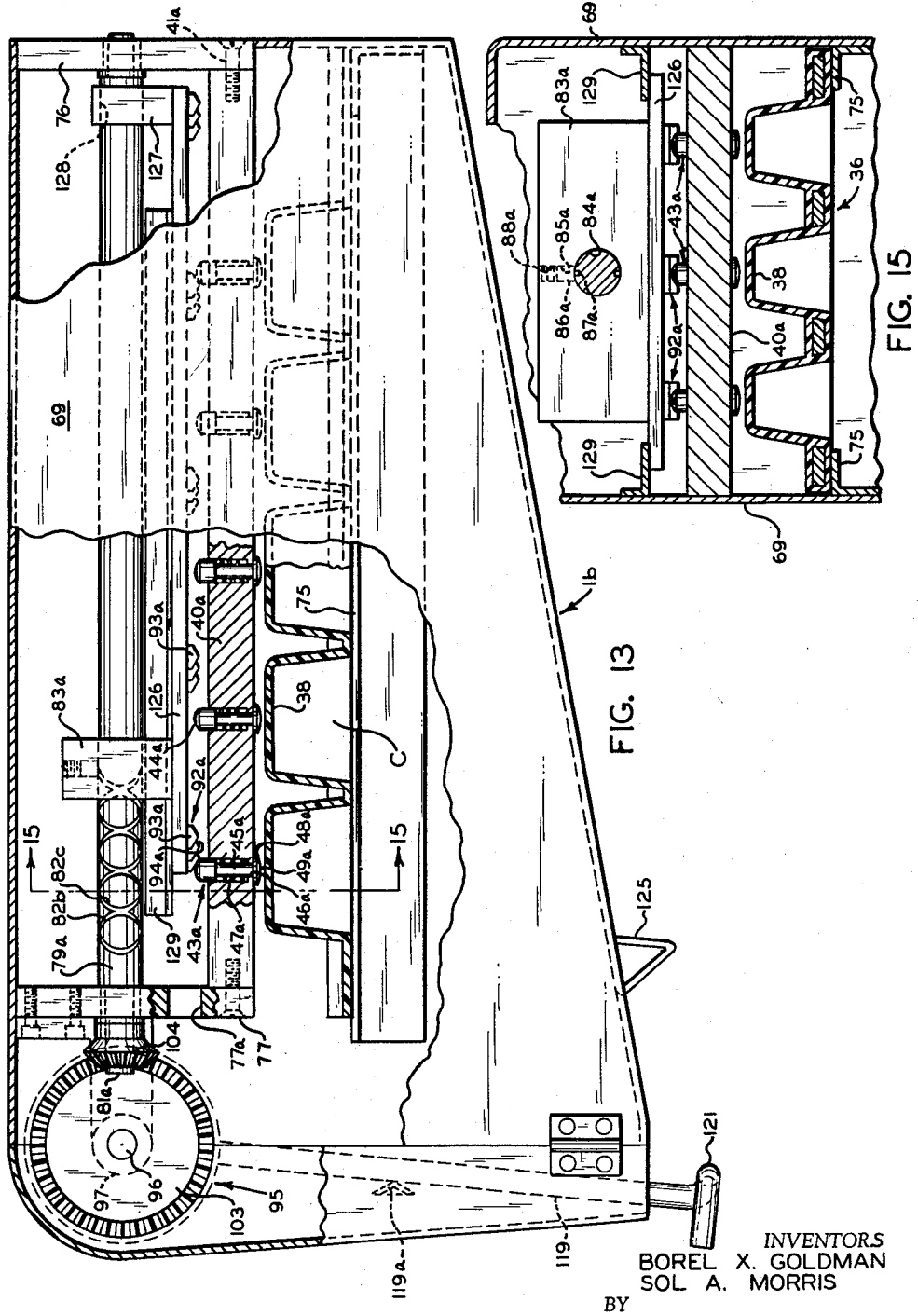

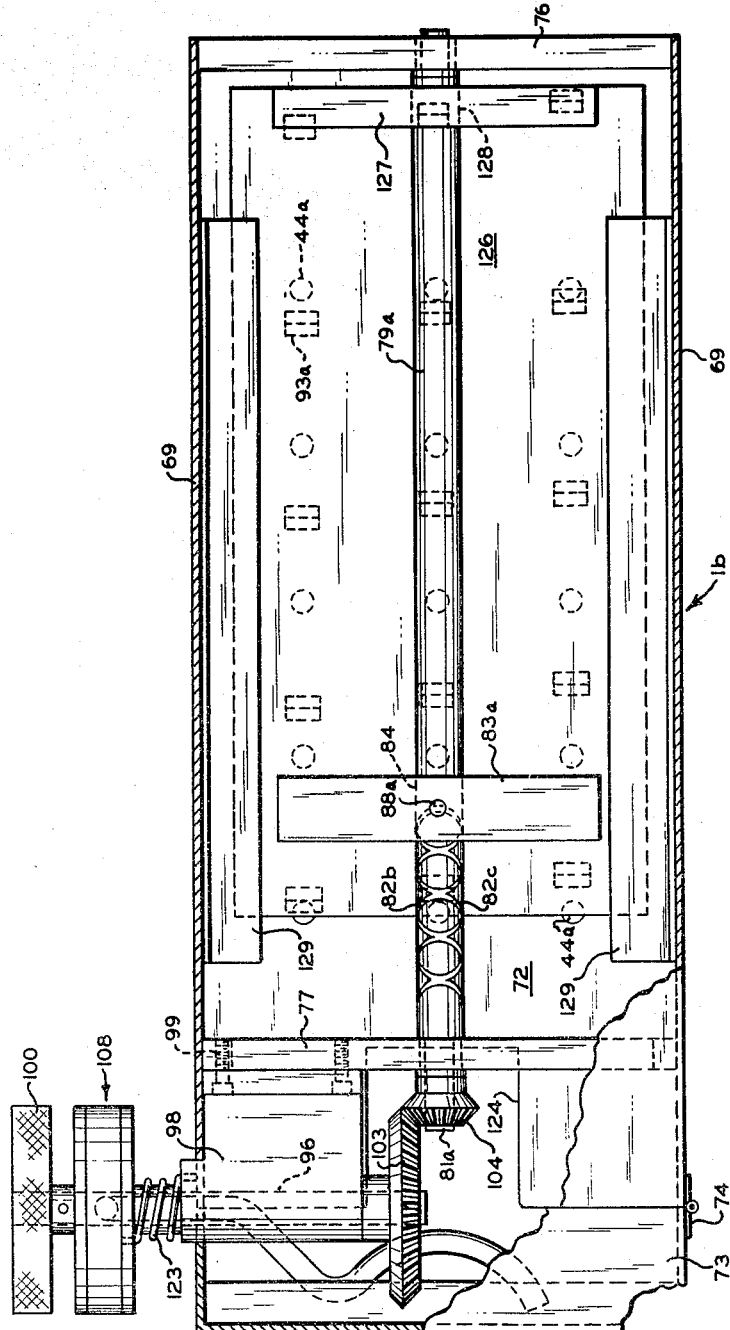

United States Patent Office 2,957,604
Patented Oct. 25, 1960

2,957,604

ICE CUBE DISPENSER

Borel X. Goldman, Saginaw, Mich. (2953 Beechwood Drive SE., Grand Rapids, Mich.), and Sol A. Morris, Saginaw, Mich., assignors, by mesne assignments, to Borel X. Goldman, Grand Rapids, Mich.

Filed Feb. 17, 1958, Ser. No. 715,724

23 Claims. (Cl. 221—88)

This application is a continuation-in-part of application Serial No. 704,401, filed December 23, 1957, now abandoned.

This invention relates to apparatus for dispensing ice cubes from an ice cube tray and more particularly to apparatus capable of dispensing ice cubes individually and successively from a tray having a plurality of ice cube containing compartments.

Various kinds of ice cube dispensing devices have been proposed heretofore for dispensing both single and multiple ice cubes, but not all of them have been altogether satisfactory for a number of reasons, e.g., the amount of space required to accommodate such dispensing services and the complexity of construction and the consequent high cost of such apparatus. Another disadvantage of those devices adapted to dispense simultaneously all of the ice cubes of a particular tray is that those cubes which are not needed for immediate use must be stored or thrown away, and, if stored, have a tendency to adhere one to another and form a mass of rigidly interconnected cubes which are difficult to separate, thereby defeating the very purpose for which the dispensing apparatus was designed.

An object of this invention is to provide ice cube dispensing apparatus adapted for use with substantially conventional ice cube trays and capable of dispensing a selected number of cubes from the compartments of the tray.

Another object of the invention is to provide ice cube dispensing apparatus capable of dispensing ice cubes one by one from the compartments of a tray in response to actuation of an operator, the construction being such that ice cubes are delivered to a predetermined location when dispensed.

A further object of the invention is to provide ice cube dispensing apparatus adapted to traverse a tray of ice cubes and successively dispense cubes therefrom, the traversing movements of the apparatus being imparted by unidirectional actuating means.

Another object of the invention is to provide ice cube dispensing apparatus of the kind referred to which occupies little space and which is simple in construction and economical to build.

A further object of the invention is to provide an ice cube tray especially adapted for use in conjunction with dispensing apparatus formed in accordance with the invention.

Other objects and advantages of the invention will be pointed out specifically or will become apparent from the following description when it is considered in conjunction with the accompanying drawings, in which:

Figure 6 is a fragmentary, sectional view taken on the line 6—6 of Figure 5;

Figure 7 is a sectional view taken on the line 7—7 of Figure 6;

Figure 8 is a partly side elevational and partly sectional view of another embodiment;

Figure 13 is a view similar to Figure 8, but showing another embodiment of the invention;

Figure 14 is a partly sectional and partly top plan view of the structure shown in Figure 13; and Figure 15 is a sectional view taken on the line 15—15 of Figure 13.

Figure 1:
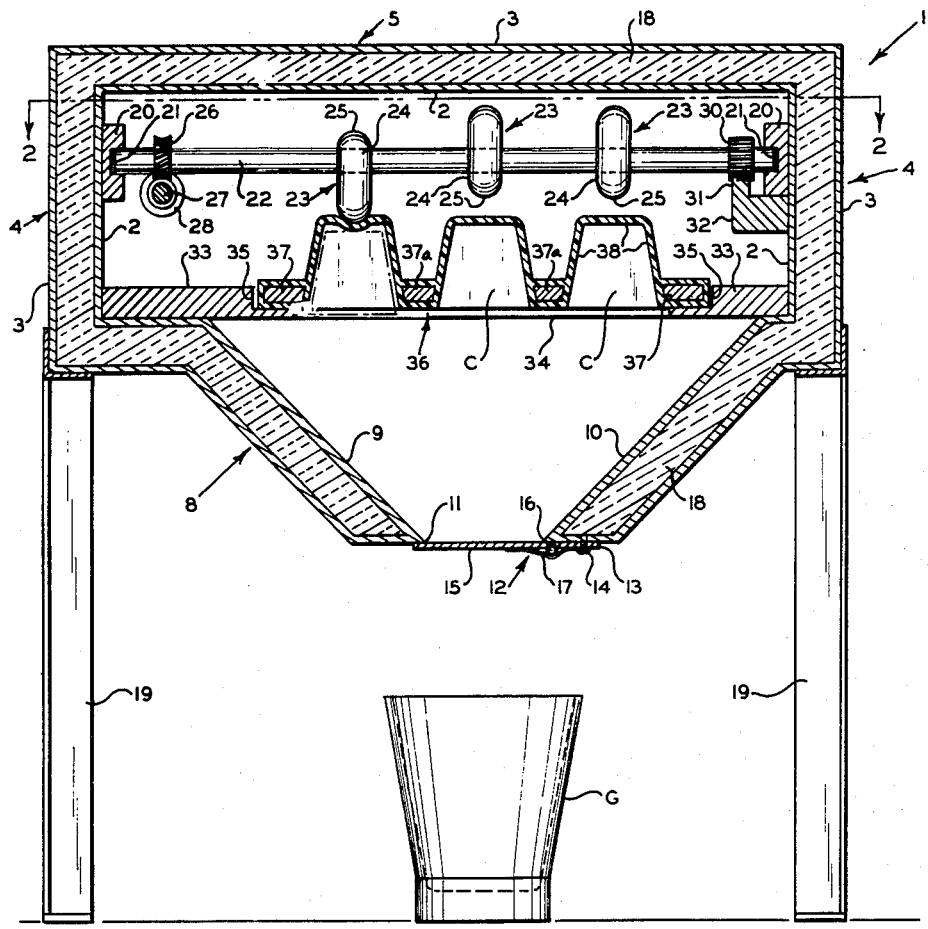
Fig. 1 is a vertical sectional view of apparatus constructed in accordance with one embodiment of the invention and disclosing the apparatus in the act of dispensing a single ice cube from a tray.

Apparatus constructed in accordance with the embodiment disclosed in Figures 1–4 comprises a support or housing 1 composed of inner and outer panels 2 and 3, respectively, connected one to another in any suitable manner to form side members 4, a top member 5, a rear member 6, a front member 7 and a bottom member 8. The bottom member 8 preferably includes a pair of members 9 and 10 which extend downwardly along converging lines, but which terminate short of intersection so as to form a discharge opening 11 which extends longitudinally of the housing 1. The opening 11 may be closed by a gate member 12 comprising a hinge leaf 13 secured to one of the members 9 or 10 by means of screws 14 and hingedly connected to a closure panel 15 by means of a piano-type hinge 16. The closure panel 15 preferably is yieldably maintained in its closed position by a spring 17 which is of such strength as to assure closing of the panel 15, but which is capable of yielding under the weight of a single ice cube so as to permit the panel 15 to swing open and discharge the ice cube through the opening 11. The spaces between the inner and outer panels 2 and 3 preferably may be filled with insulating material 18 of any known kind.

It is contemplated that the housing 1 may be removably contained within a conventional refrigerator or be included as a permanent part of the latter. If the apparatus is to be contained within the refrigerator for removal, any number of conventional means may be used for supporting the housing. One such means could be bayonet-type slots formed in the upper member 5 of the support 1 adapted to receive studs projecting from the top wall of the refrigerator freezing compartment. Alternatively, the support 1 could be used in conjunction with supporting legs 19 having their upper ends shaped to receive the support 1 and the legs 19 could be either rigidly or detachably connected to the support 1. If the apparatus forms a permanent part of the refrigerator, it would not be necessary to insulate the walls of the support 1. In such a construction, the support 1 could be mounted in the freezing compartment of the refrigerator or could have refrigeration coils associated therewith.

Figures 3, 4:
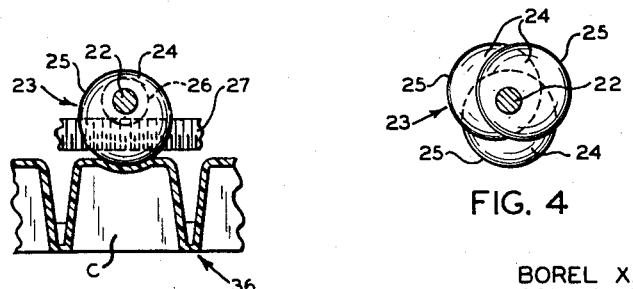
Figure 3 is a view partly in side elevation and partly in section of a detail of the apparatus, the section being taken on the line 3—3 of Figure 2.
Figure 4 is a sectional view taken on the line 4—4 of Figure 2.

In the embodiment of the invention shown in Figures 1–4, the inner panel 2 of the side members 4 has secured thereto in any suitable manner, as by welding, a pair of longitudinally extending guide elements 20. Each of the guide elements 20 has a channel 21 formed therein so as to face inwardly of the support. The channels 21 are adapted to receive opposite ends of a mounting shaft 22 which spans the distance between the guide elements 20. Mounted fast on the shaft 22 is a plurality of spaced dispensing devices 23 which, in the form shown, comprise disc-like elements 24 having crowned peripheral edges 25. Each of the disc elements 24 is eccentrically mounted on the mounting shaft 22 and in the illustrative embodiment of the invention there are three disc elements 24 so arranged with respect to one another that their directions of eccentricity are spaced 120° from one another, as is best shown in Figure 4.

Figure 2:
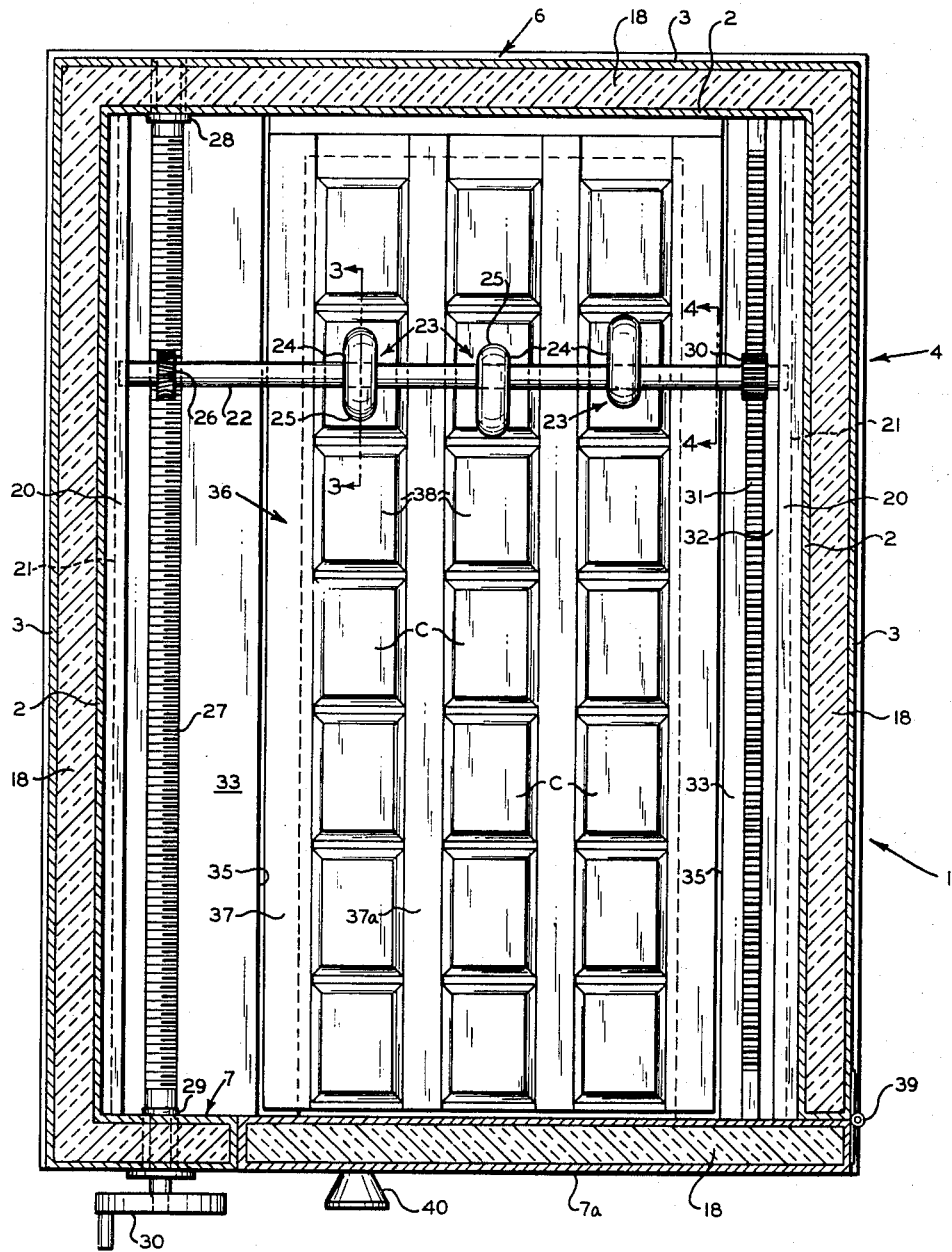
Figure 2 is a sectional view taken on the line 2—2 of Figure 1.

Adjacent to one end of the shaft 22 is keyed or otherwise suitably secured a worm gear operating part 26 which meshes with a worm operating shaft 27 extending longitudinally of the support 1 and having its ends journaled in bearings 28 and 29 mounted in the rear and front members 6 and 7, respectively. As is best shown in Figure 2, the forward end of the operating shaft 27 extends through the front member 7 and has fixed thereto an actuating wheel or crank 30a by means of which the operating shaft 27 may be rotated.

Rotation of the operating shaft 27 will cause rotation of the mounting shaft 22 so as to move the latter fore and aft of the support 1. Since the driving force for the mounting shaft 22 is applied near one end of the latter, means is provided for maintaining the shaft in a position substantially parallel with the front and rear members of the support 1. Such means conveniently may comprise a spur gear 30 fixed on the mounting shaft 22 adjacent to the end of the latter and in mesh with a rack 31 supported on a bracket 32 which may be fixed in any suitable manner to the inner panel 2 of a side member 4 and arranged to extend longitudinally of the support 1.

Forming a part of the main support 1 and secured in any suitable manner to the inner panel 2 of the latter is a supporting member 33 of substantially rectangular form and having a rectangular opening 34 therein. If desired, the edges of the member 33 defining the opening 34 may be recessed as at 35 so as to accommodate an ice cube tray designated generally by the reference character 36.

The ice cube tray 36 preferably comprises a metal or other rigid reinforcing member 37 forming a closed, substantially rectangular loop and to which is bonded, molded or otherwise suitably secured a plurality of wall panels 38 so arranged and connected one to another as to provide a plurality of rows of individual compartments C in which ice cubes may be formed and retained. In the illustrative embodiment of the invention, the ice cube tray 36 is provided with three parallel rows of tapered compartments C, but more or less rows may be provided as desired.

The material from which the tray compartments are formed may vary, but the material should be tough, thin, and deformable at low temperatures. One material having the desired characteristics is polyethylene, but any material having similar characteristics would be satisfactory. Since the tray forming material must be deformable, it is preferable that the rigid frame or flange 37 be of such strength as to resist deformation of the tray. To assure a suitable strong frame, rigid reinforcing elements 37a may be placed between adjacent rows of compartment and be secured at the ends to the frame member 37.

The apparatus disclosed in Figures 1–4 is conditioned for operation by placing a tray containing ice cubes within the support 1 in inverted position. To facilitate the insertion and removal of a tray from the support 1, the front member 7 of the latter may be equipped with a door 7a hinged as at 39 to the right hand side member 4 as viewed in Figure 2. A knob 40 may be included on the door 7a to facilitate opening of the latter.

When the tray containing ice cubes is in inverted position within the main support 1, the cubes within the compartments C will not fall out of the latter because of the adherence of the cubes to the walls of the compartments. When it is desired to dispense an ice cube, however, the operating shaft 27 may be rotated so as to cause rotation of the mounting shaft 22 and, consequently, movement of the latter and the dispensing devices 23 in a direction either towards or away from the front member 7, depending on the direction of rotation of the shaft 27. As the mounting shaft 22 moves in a forward direction to the position shown in Figures 1 and 2, one of the eccentric discs 24 will bear against the bottom wall 38 of one of the compartments C and depress that wall so as to eject an ice cube from that compartment. The ejected ice cube will fall by gravity towards the closure panel 15 and the weight of the cube will cause the panel to open so as to permit the cube to pass from within the housing 1 into a receptacle such as a glass G. Thereafter, the spring 17 will restore the panel 15 to its closed position.

Although one of the eccentric discs 24 engages and depresses the bottom wall of one of the compartments C, the remaining discs 24 will be free of engagement with the walls of the compartments in their associated rows because of the angularly diverging arrangement of directions of eccentricity of the several discs. Further forward movement of the mounting shaft 22, however, will cause another disc 24 to bear against the bottom wall 38 of its adjacent compartment C and eject the ice cube in a similar manner. Still further movement of the shaft 22 will cause the third disc 24 to eject the ice cube from its adjacent compartment.

In order to assure dispensing of all of the ice cubes from the tray 36, the ratios between the gears 26 and 27 and the gears 30 and 31 should be the same and the diameters of the gears 26 and 30 should be such that one revolution of the operating shaft 27 will effect movement of the mounting shaft 22 a distance equal to the distance from the rear wall of one compartment in a row to the rear wall of the next adjacent compartment in the same row.

Figure 5:
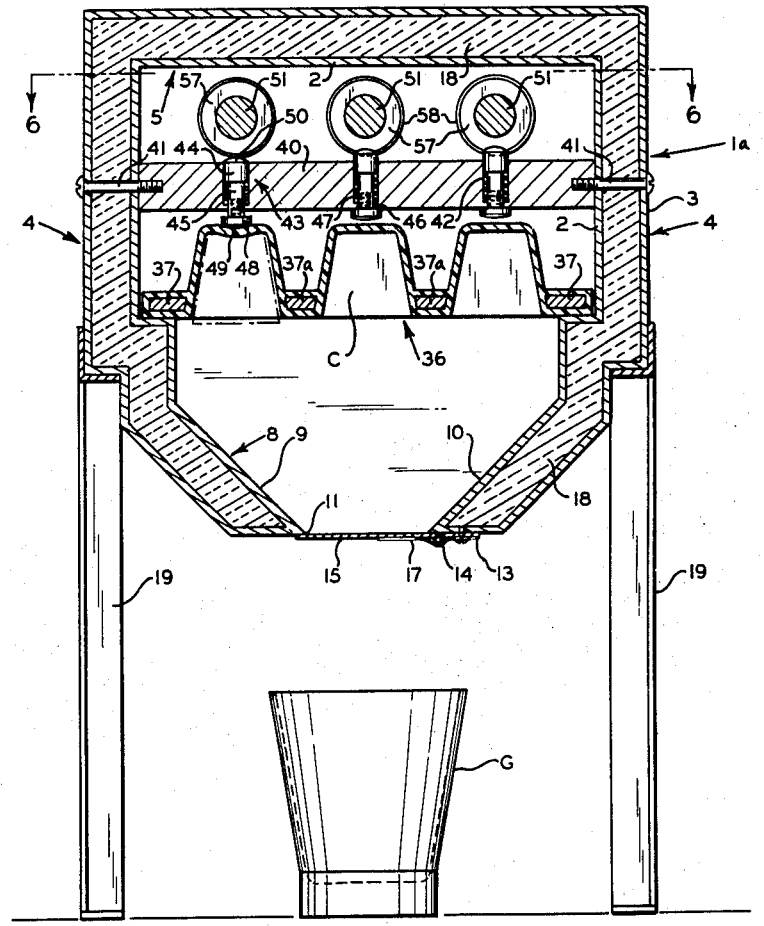
Figure 5 is a view similar to Figure 1, but showing another embodiment of the invention.
Figure 9:
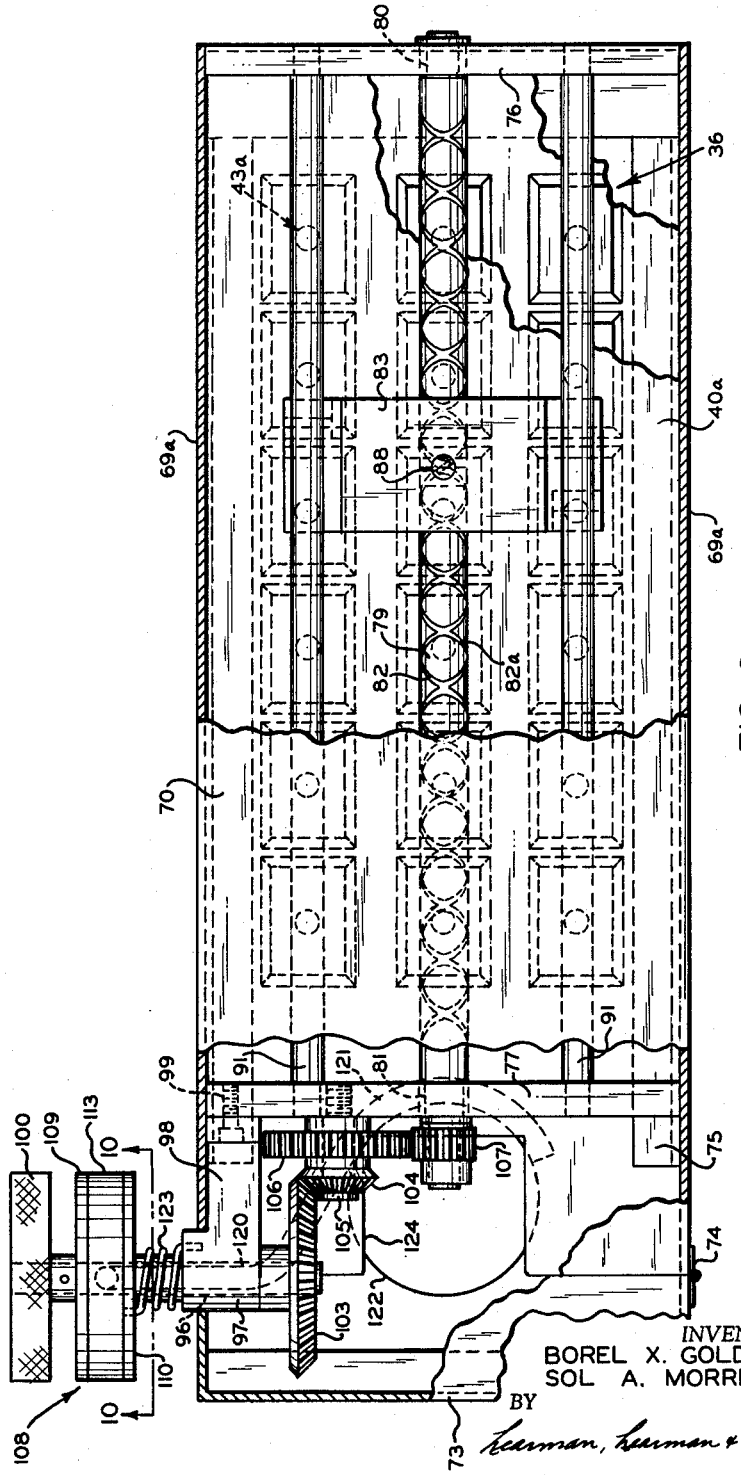
Figure 9 is a view partly in top plan and partly in section of the structure shown in Figure 8.
Figure 11:
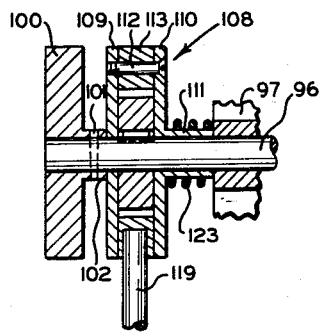
Figure 11 is a sectional view taken on the line 11—11 of Figure 10.
Figure 10:
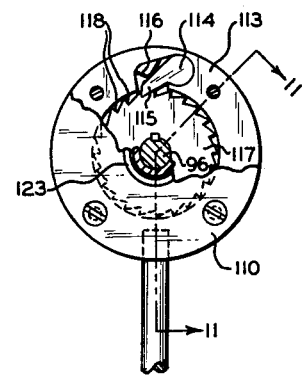
Figure 10 is a sectional view taken on the line 10—10 of Figure 9.

The embodiment of the invention shown in Figures 5–7 comprises a support or housing 1a similar in many respects to the housing 1 previously described. The principal difference between the supports 1 and 1a is the arrangement of the bottom members 8 leading to the discharge opening 11. In the support 1a, provision need not be made for extending one end of an operating shaft 27 through the front member 7, so the arrangement of the bottom members 8 can be substantially symmetrical about the vertical center line of the support. The symmetrical nature of the support 1a also eliminates the necessity for providing a supporting element such as is indicated at 33 in Figure 1 and enables the tray 36 to be supported directly on a portion of the bottom member 8 of the support 1a.

Apparatus constructed in accordance with the modified form of the invention shown in Figures 5–7 includes a substantially horizontal mounting plate 40 fixed to the side walls 4 and the rear wall 6 of the support 1a by suitable means such as bolts 41. The mounting plate 40 is provided with a plurality of rows of longitudinally spaced openings 42, the number of rows and the number of openings corresponding to the number of rows of compartments in the tray 36 and the number of compartments in a row, respectively.

In each of the openings 42 is slideably mounted a dispensing device 43 comprising a plunger having a headed end 44 and a shank 45. As is best shown in Figures 5 and 7, the openings 42 are of such diameter for a portion of their length as to accommodate the heads 44 of the devices 43, but are not of uniform diameter throughout their length. Instead, the lower end of each opening 42 is reduced in diameter so as to accommodate the lower end of the shank 45 and provide a small flange 46 on which one end of a spring 47 may rest. The other end of the spring 47 may bear against the lower surface of the head 44 of the plunger, the arrangement being such that the plunger is urged upwardly by the spring 47. The lower end of each of the plunger shanks 45 is tapped for reception of a threaded element 48, the lower surface of which is crowned as at 49. The upper surface of the plunger head 44 is similarly crowned as at 50 for a purpose yet to be explained.

Means for operating the dispensing devices 43 comprises a plurality of operating shafts, each of which has a reduced rear end portion 52 that extends through bearings 53 mounted in the rear wall 6 of the support 1a. The forward end portion of each of the shafts 51 is threaded as at 54 and extends through a threaded bushing 55 which is secured to the front member 7 of the support 1a by suitable means such as screws 56 (see Figure 6). At spaced intervals along each shaft 51 is a plurality of operating parts or enlargements 57. The peripheral edge of each of the operating parts 57 is crowned as at 58 so that when an operating part 57 engages a dispensing device 43 the cooperating crowned surfaces of the parts 57 and 44 will effect downward displacement of the device 43 against the bias of its spring 47.

A gear box 59 composed of a substantially U-shaped channel 60 and a rear plate 61 secured to the channel 60 by screws 62 is located at the forward end of the support 1a. The rear plate 61 is apertured for reception of a reduced end portion 63 of each of the operating shafts 51 and on each of the shaft portions 63 is fixed a pinion 64 by suitable means such as a set screw 65. Between each pair of pinions 64 is an idler gear 66 mounted on a stub shaft 67 which may be screwed into the rear plate 61 of the gear box. The reduced end portion 63 of one of the shafts 51, preferably the central shaft, may be extended so as to project through the front wall of the gear box and be provided with an actuating wheel or crank 68 by means of which the several shafts 51 may be actuated.

In the operation of the modified embodiment of the invention the ice cube tray 36 is inserted in the support 1a in inverted position through the door 7a. When it is desired to dispense an ice cube from the tray, the actuating means 68 may be rotated so as to cause rotation of the shafts 51 in their threaded bushings 55. Rotation of the operating shafts 51 relative to the bushings 55 will effect longitudinal movement of the shafts 51 and, consequently, corresponding movement of the operating parts 57 in directions fore and aft of the support 1a depending upon the direction of rotation of the crank 68. The positions of the parts shown in Figures 6 and 7 are such that the crank should be rotated in such direction as to cause the operating shafts 51 and the operating parts 57 to move towards the front member 7 of the support 1a. As is shown in Figures 5 and 7, the left hand operating part 57 has engaged and depressed the rearmost of its associated dispensing plungers 43 to its fullest extent, thereby causing the element 48 to engage and deform the bottom wall 38 of the left hand corner compartment C and eject the ice cube therefrom. The spacing and arrangement of the operating parts 57 on the other two shafts 51 are such, however, that the dispensing plungers 43 associated therewith are not depressed sufficiently far to deform the bottom walls of the associated ice cube compartments. Consequently, the ice cubes in the rearmost compartments of the other two rows of compartments will not be ejected.

As is best shown in Figures 6 and 7, the spacing between the dispensing plungers 43 is uniform and corresponds to the spacing between compartments of the ice cube tray 36. The spacing between the operating parts 58 on each of the operating shafts 51 also is uniform, but is less than the spacing between the dispensing plungers. Thus, the operating parts 57 for any given row of plungers must be moved longitudinally of the support 1a to actuate a plunger and no two plungers in the same row will be actuated simultaneously. The arrangement of the operating parts 57 on the three shafts 51 is such that only one plunger in any row engages and deforms a compartment wall at any given time. In other words, the operating parts 57 on the several shafts 51 are staggered longitudinally of the tray so as to effect ejection of ice cubes from successive rows of compartments in directions fore and aft of the support 1a.

Ice cubes discharged from the compartments C will fall by gravity against the closure panel 15 and cause the latter to open to deliver the ejected cubes to a container such as a glass G.

The foregoing description of the apparatus has been concerned with the dispensing of single ice cubes from a tray, but is should be understood that multiple cubes may be dispensed upon continued operation of the actuating devices 30 and 68. In other words, one or more ice cubes may be dispensed with apparatus constructed in accordance with either embodiment of the invention described thus far, depending on the length of time the operating parts 22 or 57 are actuated.

The embodiment of the invention disclosed in Figures 8–12 comprises a housing 1b composed of side walls 69, a top wall 70, a rear wall 71, and a sloping bottom wall 72, the walls being secured one to another by suitable means such as welding. The front end of the housing may be closed by a door member 73 hingedly mounted on one of the side walls 69 by means of a hinge construction 74. The housing 1b is not shown as having insulated walls, but they may be so constructed, if desired. The housing 1b may be either removably or permanently mounted within a refrigerator by any of the devices previously referred to.

Mounted on the inner surfaces of the side walls 69 by suitable means such as welding is a pair of angle brackets or supports 75 on which the ice cube tray 36 is adapted to be supported in inverted position.

A mounting plate 40a similar in all respects to the mounting plate 40 is mounted within the housing 1b and above the ice cube tray 36 by suitable means such as screws 41a. The mounting plate 40a is equipped with a plurality of rows of longitudinally spaced dispensing devices 43a similar in all respects to the dispensing devices 43. In order to avoid duplicating a large portion of the previous description of the dispensing devices 43, each of the dispensing devices 43a has its parts identified by the same reference characters used to identify the corresponding parts of the dispensing devices 43, but each of the characters applied to the dispensing devices 43a is followed by the letter a.

To the rear wall 71 of the housing 1b is secured by certain of the screws 41a an upstanding plate 76 and a similar plate 77 is secured to the forward end of the mounting plate 40a by means of screws 78. An operating shaft 79 has a reduced rear end 80 journaled in the rear plate 76 and has a reduced forward end 81 journaled in and extending beyond the front plate 77. The shaft 79 is provided with oppositely pitched threads 82 and 82a which extend substantially the full length of the shaft.

Apparatus formed in accordance with the modified embodiment of the invention includes an operating block 83 movable longitudinally fore and aft of the housing and having a bore 84 extending therethrough of such size as to accommodate the operating shaft 79. The block 83 also is provided with a bore 85 in which is rotatably received a pin 86 having a depending projection 87 adapted to be received in either of the threads 82 or 82a and thereby threadedly interconnect the shaft 79 and the block 83. The upper end of the bore 85 is enlarged and threaded for reception of a threaded screw 88 which prevents inadvertent withdrawal of the projection 87 from the threads of the operating shaft 79. The sides of the block 83 may be notched as at 89 to provide wings 90 adapted to ride under guide rods 91 having their ends fixed in the front and rear plates 77 and 76, respectively, the purpose of the wings 90 and the guide rods 91 being to prevent rotation of the block 83 with the operating shaft 79.

Secured to the lower surface of the operating block 83 in any suitable manner, such as by welding, is a plurality of operating elements or parts designated generally by the reference character 92, each of which includes a body portion 93 terminating at its lower end in double cam surfaces 94 facing forwardly and rearwardly of the housing. The number of operating parts 92 corresponds to the number of longitudinal rows of compartments C in the ice cube tray 36 and the overall height of each operating part 92 is such that movement of the operating block 83 longitudinally of the ice cube tray 36 will cause successive engagement between the cam surfaces 94 and the crowns 44a of the dispensing devices 43a so as to depress the associated dispensing devices 43a and effect depression of the walls 38 of the compartments C and, consequently, eject the ice cubes from the compartments. As is best shown in Figure 8, the operating parts 92 are staggered on the block 83 in a direction from front to rear so that only one dispensing device 43a will be engaged by an operating part 92 at any given time.

Actuating means for effecting operation of the dispensing devices is designated generally by the reference character 95 and includes a shaft 96 journaled in a hub 97 carried by a bracket 98 which is mounted at one side of the front plate 77 by suitbale means such as screws 99. At one of its ends the shaft 96 mounts a hand wheel 100 which is made fast with the shaft by means of a tapered or the like pin 101 received in openings in the wheel hub 102 and in the shaft 96, whereby the latter may be rotated. On the other end of the shaft 96 is keyed or otherwise fixed a bevel gear 103 which meshes with a bevel gear 104 keyed or pinned to a stub shaft 105 threaded or otherwise suitably mounted on the front plate 77. Also keyed or pinned to the shaft 105 is a spur gear 106 which, in turn, meshes with a spur gear 107 fixed on the forwardly projecting end of the operating shaft 79. The several gears, together with the shaft 79, constitute motion transmission means for transmitting motion of the shaft 96 to the member 83, and the ratios of the several gears are so selected that a predetermined amount of rotation of the shaft 96 and the gear 103 will effect sufficient rotation of the operating shaft 79 to advance the operating block 83 a sufficient distance relative to the mounting plate 40a to effect engagement between one of the operating parts 92 and its associated dispensing device 43a.

The actuating apparatus 95 preferably includes a unidirectional ratchet mechanism 108 which may comprise a pair of spaced apart discs 109 and 110 loosely mounted on the shafts 96 intermediate the hand wheel 100 and the hub 97. The disc 110 preferably includes a hub 111 which serves as a bearing for the ratchet mechanism. Interposed between the plates 109 and 110 and secured thereto by means of screws 112 is a pawl carrier 113 on which is pivotally mounted a ratchet pawl 114 having a toothed end 115 normally urged radially inwardly by a spring 116. A ratchet wheel 117 is keyed or otherwise mounted fast on the shaft 96 between the plates 109 and 110 and is provided with teeth 118 at its peripheral edge adapted to be engaged by the toothed end 115 of the ratchet pawl 114. The construction and arrangement of the ratchet mechanism parts are such that rotation or rocking of the pawl carrier 113 in a counterclockwise direction, as viewed in Figures 9 and 10, will cause counterclockwise rotation of the ratchet wheel 117 and, consequently, counterclockwise rocking of the shaft 96 so as to effect rotation of the operating shaft 79 and movement of the operating block 83 longitudinally of the ice cube tray 36.

Means for rocking the pawl carrier 113 preferably comprises a rod 119 having one of its ends force-fitted or otherwise suitably secured in an opening formed in the pawl carrier 113. The rod 119 should be of such length as to extend beyond the lower wall 72 of the housing 1b and may be provided with a laterally bent section 120 which extends under the housing 1b. The rod portion 120 may include an angular portion 121 shaped to embrace a glass 122 or other receptacle which, when placed against the rod portion 121, may be used to impart the above referred to counterclockwise rotation to the ratchet mechanism 108. When the glass or other article is removed from engagement with the rod 119, the latter may be returned to its normal or inactive position by means of a coil spring 123 having one of its ends anchored to the plate 110 of the ratchet mechanism and its other end anchored to the hub 97. The return movement of the rod 119 may be limited by a stop 119a fixed on the housing 1b in a position to engage the rod.

Figure 12:
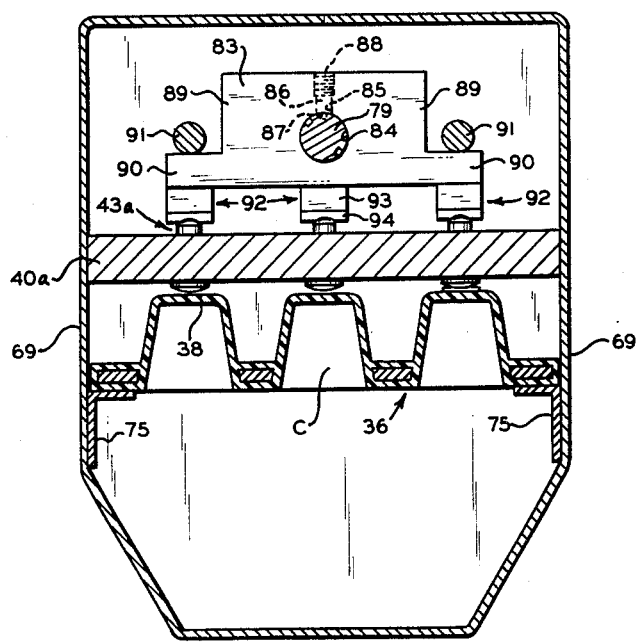
Figure 12 is a sectional view taken on the line 12—12 of Figure 8.

In the operation of the apparatus, counterclockwise rocking of the pawl carrier 113 by the rod 119 will, as has been pointed out, cause rotation of the operating shaft 79 and movement of the operating block 83 longitudinally of the latter. Movement of the block 83 longitudinally of the shaft 79 will cause one of the operating parts 92 to depress its associated dispensing device 43a, whereby the deformable wall 38 of the adjacent compartment C is depressed and the ice cube ejected. The ejected ice cube will fall to the lower wall 72 which, as is best shown in Figure 8, is inclined from rear to front so as to cause the ice cube to slide towards the front of the housing. The side walls 69 of the housing converge toward one another below the level of the ice cube tray 36, as is best shown in Figure 12, so as to assure delivery of the ice cube to the forward, substantially central portion of the lower wall 72 of the housing. At the forward end of the lower wall 72 is provided an opening 124 through which the ice cubes may drop into the container 122.

For proper incremental operation of the apparatus, each actuation of the ratchet mechanism should cause rotation of the operating shaft 79 only an amount sufficient to advance the operating block 83 a distance substantially one third the distance from one end wall of an ice cube compartment C to the corresponding end wall of the next compartment in a given row of compartments. The required amount of rotation of the ratchet mechanism may be assured by providing a stop member 125 on the lower wall 72 of the housing in a position to engage the rod portion 121. The stop member 125 conveniently may be formed from the material removed from the wall 72 to form the openings 124.

When all the cubes of a particular ice cube tray have been discharged from their compartments, the operating block 83 will be at one end or the other of the operating shaft 79. The empty ice cube tray then may be replaced by a full tray. Actuation of the ratchet mechanism 108 in the same manner as previously described then will cause the operating block 83 to move from the one end of the shaft 79 towards the other, due to the provision of the double threads 82 and 82a on the shaft 79. The cam surfaces 94 on the operating parts 92 are effective to actuate the dispensing devices 43a in either direction of motion of the operating block 83.

When it is desired to dispense a plurality of ice cubes from a tray, the rod 119 may be rocked a number of times or, alternatively, the hand wheel 100 may be rotated manually. In either event, as many ice cubes as may be desired may be dispensed from the tray.

The embodiment of the invention shown in Figures 13–15 is generally similar to the apparatus shown in Figures 8–12, but differs from the latter in certain respects as will be pointed out. The modified construction includes an operating shaft 79a having oppositely pitched threads 82b and 82c provided therein for only a small portion of the length of the shaft. An operating block 83a is provided with a horizontal bore 84 of such size as to accommodate the shaft 79a and also is provided with a vertical bore 85a in which is rotatably received a pin 86a having an extension 87a at its lower end adapted to be received in the threads 82b and 82c. The upper end of the bore 85a is threaded for reception of a screw 88a which prevents inadvertent removal of the pin 86a.

To the lower surface of the operating block 83a is welded or otherwise suitably secured a carrier plate 126 which extends fore and aft of the housing 1b and which is maintained parallel to the mounting block 40a by means of a plate 127 secured at the rear end of the plate 126 and having an opening 128 therein of such size as rotatably to accommodate the rear end of the shaft 79a.

Secured to the lower surface of the carrier plate 126 in any suitable manner, such as by welding, is a plurality of laterally and longitudinally spaced operating parts or elements 92a similar to the elements 92. Each of the elements 92a includes a body portion 93a terminating at its lower end in double cam surfaces 94a. The number of operating elements 92a corresponds to the number of dispensing devices 43a and, as is best shown in Figures 13 and 14, the operating parts 92a are staggered in a direction from front to rear across the width of the carrier plate 126. The longitudinal spacing of the parts 92a is uniform, but differs from the spacing of the dispensing devices 43a for a purpose presently to be explained.

The construction and arrangement of the parts thus far described are such that rotation of the shaft 79a in either direction will cause movement of the block 83a and the carrier plate 126 longitudinally of the housing 1b so as to effect successive engagement of the operating parts 92a with their respective dispensing devices 43a and thereby effect ejection of ice cubes from the associated tray compartments C. In order to preclude all possibility of rotation of the carrier plate 126 with the shaft 79a, brackets 129 (see Figure 15) are welded or otherwise suitably secured to the inner surfaces of the sidewalls 69 of the housing 1b and are arranged to overlie the lateral edges of the carrier plate 126.

The actuating mechanism 95 for the apparatus shown in Figures 13–15 is similar to that previously described in connection with Figures 8–12 and, therefore, need not be described in detail. It may be noted, however, that certain of the gears of the motion transmitting mechanism of the earlier described embodiment may be omitted in the construction shown in Figures 13–15, inasmuch as the overall travel of the mounting block 83a is much less than the overall travel of the mounting block 83. In the embodiment shown in Figures 13–15, the miter gear 103 meshes with the miter gear 104, but the latter gear is mounted directly on the projecting forward end 81a of the shaft 79a so that rotation of the gear 103 is imparted directly to the shaft 79a without the necessity of any intermediate gearing.

The operation of the embodiment disclosed in Figures 13–15 is generally the same as the operation of the embodiment shown in Figures 8–12 in that each actuation of the ratchet mechanism 108 by the rod 119 will cause rotation of the shaft 79a and consequent movement of the operating block 83a and the carrier plate 126. The arrangement and spacing of the operating elements 92a on the carrier plate 126 are such that upon each actuation of the ratchet mechanism 108 one of the operating elements 92a will engage and depress one of the dispensing devices 43a. For example, actuation of the ratchet mechanism 108 when the parts are in the positions shown in Figure 14 will cause movement of the carrier plate 126 towards the left so as to effect engagement between the operating part 92a and the associated dispensing device 43a at the upper left hand corner of the mounting plate 40a. A second actuation of the ratchet mechanism then will cause engagement between the forward, center operating part 92a and the forward, center dispensing device 43. A third actuation of the ratchet mechanism will cause engagement between the operating part 92a adjacent to the lower left hand end of the plate 126a and the corresponding dispensing device 43a. By this time, the carrier plate 126 will have been moved a distance sufficient to the left to locate the second operating element 92a in the upper row of elements in readiness to engage the second dispensing device 43a in the corresponding row of dispensing devices. Further actuation of the ratchet mechanism will cause further forward movement of the carrier plate 126 and, consequently, successive ejection of the ice cubes in the compartments C.

By the time the plate 126 has been moved as far forwardly as possible, all of the ice cubes in the tray 36 will have been ejected, whereupon the empty tray may be removed from the housing 1b and a full tray substituted therefor. Thereafter, the ratchet mechanism 108 may be actuated again and, due to the provision of the oppositely pitched threads on the shaft 79a, the plate 126 and its associated parts will be moved to the rear and again effect successive ejection of the ice cubes from the tray.

In order to avoid making the housing 1b unnecessarily large, the front supporting plate 77 may be provided with a slot 77a through which the forward end of the plate 126 may extend when the latter has been moved as far forwardly as is possible.

The disclosed embodiments are representative of presently preferred forms of the invention, but are intended to be illustrative rather than definitive thereof. The invention is defined in the claims.

We claim:

1. Ice cube dispensing apparatus comprising support means for supporting in inverted position an ice cube tray having yieldable walls forming at least one longitudinally extending row of compartments; a dispensing device associated with each of said compartments; means mounting each of said devices for movement into engagement with a wall of its associated compartment to depress said wall and eject the ice cube from said associated compartment; operating means movable longitudinally fore and aft of said support means for effecting successive operation of said dispensing devices; unidirectional actuating means; and means interconnecting said actuating means and said operating means for effecting movements of the latter both fore and aft of said support means.

2. Apparatus as set forth in claim 1 wherein each of said dispensing devices comprises a plunger having a part located in the path of movement of said operating means.

3. The apparatus set forth in claim 1 wherein said actuating means includes a ratchet device and means connected to said ratchet device for operating the latter.

4. Ice cube dispensing apparatus comprising a housing; support means in said housing for supporting in inverted position an ice cube tray having yieldable walls forming a plurality of compartments arranged in rows; operating means movable longitudinally fore and aft of said housing and including a plurality of spaced operating parts extending therefrom and corresponding to the number of rows of compartments; a plurality of spaced dispensing devices arranged in rows to correspond to the number of compartments; means mounting each of said dispensing devices above the level of said tray for movement into engagement with a wall of its associated compartment to depress said wall and eject an ice cube from said associated compartment, each of said dispensing devices including a part located in the path of movement of one of said operating parts; unidirectional actuating means; and means interconnecting said actuating means and said operating means for effecting movement of the latter both fore and aft of said housing.

5. The apparatus set forth in claim 4 wherein each of said operating parts comprises a cam element having a cam surface formed on its forward and its rearward face.

6. The apparatus set forth in claim 5 wherein said cam elements are staggered in a direction fore and aft of said operating member.

7. The apparatus set forth in claim 5 wherein said cam elements are staggered in a direction fore and aft of said operating member and wherein the spacing between said cam elements is different from the spacing between said dispensing devices.

8. Apparatus as set forth in claim 5 wherein said actuating means comprises a ratchet device and a manually movable arm for initiating actuation of said ratchet device.

9. Apparatus as set forth in claim 4 wherein said housing includes a bottom wall sloping from rear to front, said wall having an opening therein adjacent to its forward end to permit the discharge of an ice cube from said housing.

10. Ice cube dispensing apparatus comprising a support; an ice cube tray supported in inverted position by said support, said tray having yieldable walls defining at least one longitudinal row of separate compartments; dispensing means; means mounting said dispensing means above the level of said tray for movement into engagement with a wall of said tray to depress said wall and eject an ice cube from the associated compartment; operating means movable longitudinally of said tray for effecting successive engagement of said dispensing means with a wall of each of the compartments in said row; and means for effecting movement of said operating means.

11. Ice cube dispensing apparatus comprising a support; an ice cube tray supported in inverted position by said support, said tray having yieldable walls defining a plurality of parallel, longitudinally extending rows of separate compartments; dispensing means for each of said rows of compartments; means mounting each of said dispensing means above the level of said tray adjacent to its associated row of compartments, and for movement into engagement with a wall of its associated row of compartments to depress the latter and eject an ice cube therefrom; operating means movable longitudinally of said tray for effecting successive engagement of each of said dispensing means with the compartments of the associated row; and means connected to said operating means for effecting movement thereof.

12. The apparatus set forth in claim 11 in which the dispensing means for each of said rows is offset with respect to the dispensing means for the remaining rows.

13. The apparatus set forth in claim 11 wherein the operating means for the dispensing means of each row of compartments is offset with respect to the operating means for the remaining rows.

14. Ice cube dispensing apparatus comprising support means; an ice cube tray supported by said support means in inverted position, said ice cube tray having yieldable walls forming at least one longitudinally extending row of separate compartments; dispensing means operable to depress a wall of a compartment to discharge an ice cube therefrom; means mounting said dispensing means above the level of said tray for movement longitudinally thereof; and operating means connected to said mounting means for moving the latter and said dispensing means so as successively to cause engagement of said dispensing means with a wall of each compartment and discharge ice cubes from said row of compartments.

15. Apparatus as set forth in claim 14 wherein said tray has a plurality of parallel rows of spaced compartments and wherein said dispensing means includes a dispensing device associated with each of said rows.

16. Apparatus for dispensing ice cubes comprising a tray having yieldable walls forming at least one row of longitudinally spaced compartments; means for supporting said tray in inverted position; dispensing means for each of said compartments; means mounting each of said dispensing means above the level of said tray and for movement into engagement therewith to depress a wall of each compartment and discharge an ice cube therefrom; operating means for moving said dispensing means; and means mounting said operating means for movement of the latter longitudinally of said tray so as successively to operate said dispensing means.

17. Apparatus as set forth in claim 16 wherein said dispensing means comprises a plurality of plungers spaced according to the spacing of said compartments, each of said plungers having a part located in the path of movement of said operating means.

18. Apparatus as set forth in claim 17 wherein said mounting means for said operating means includes a longitudinally movable element and wherein said operating means comprises an enlargement on said element for engagement with said part of said plunger.

19. Apparatus as set forth in claim 18 wherein said element is provided with a number of spaced enlargements corresponding to the number of plungers and wherein the spacing between said enlargements is less than the spacing between said plungers.

20. In combination, an ice cube tray having a rigid frame member and deformable wall portions extending from said frame member to form at least one open ice cube compartment; a support having an opening therein and which receives said tray in inverted position above said opening; dispensing means; means mounting said dispensing means on said support above said tray and for movement into engagement with the latter to deform a deformable wall portion of said compartment and eject an ice cube therefrom; operating means on said support operable to move said dispensing means; and means on said support and under said opening for receiving and delivering an ejected ice cube.

21. The combination set forth in claim 20 wherein said tray includes a plurality of compartments arranged in parallel rows and wherein said dispensing means includes a dispensing device associated with each row and whereing said mounting means is movable longitudinally of said rows.

22. The combination set forth in claim 20 wherein said tray includes a plurality of compartments arranged in parallel rows and wherein said dispensing means includes a corresponding plurality of plungers arranged one over each compartment and wherein said operating means is movable longitudinally of said tray.

23. Apparatus for dispensing ice cubes comprising an ice cube tray having walls defining a plurality of rows of open top compartments extending longitudinally of said tray; support means for supporting said tray in inverted position; a plurality of rotatable shafts journaled by said support means above the level of said tray and extending longitudinally of said tray, the number and arrangement of said shafts corresponding to the number and arrangement of said rows of compartments; dispensing means located above the level of said tray operable in response to rotation of said shafts to effect depression of a wall of the compartments and ejection of ice cubes therefrom; manipulatable actuating means; and means drivingly interconnecting said actuating means and each of said shafts whereby operation of said actuating means effects simultaneous rotation of all of said shafts.

References Cited in the file of this patent

UNITED STATES PATENTS

| | | |
|---|---|---|
| 2,053,711 | Glomb | Sept. 8, 1936 |
| 2,217,681 | Jennings et al. | Oct. 15, 1940 |
| 2,259,066 | Gaston | Oct. 14, 1941 |
| 2,809,500 | Frei | Oct. 15, 1957 |
| 2,839,899 | Baillif et al. | June 24, 1958 |